United States Patent
Koerner et al.

[11] Patent Number: 5,978,077
[45] Date of Patent: Nov. 2, 1999

[54] NON-CONTACT METHOD AND APPARATUS FOR DETERMINING CAMBER AND CASTER OF A VEHICLE WHEEL

[75] Inventors: Arthur Koerner, Rochester; James Hanson, Romeo, both of Mich.

[73] Assignee: Fori Automation, Inc., Shelby Township, Mich.

[21] Appl. No.: 08/961,753

[22] Filed: Oct. 31, 1997

Related U.S. Application Data

[60] Provisional application No. 60/029,354, Oct. 31, 1996.

[51] Int. Cl.⁶ .............................. H04N 7/18; G01B 5/24; G01B 11/26
[52] U.S. Cl. .................................. 356/139.09; 33/203.16; 33/288; 348/136
[58] Field of Search ........................... 356/139.09, 152.1, 356/152.2, 375; 33/203.16, 288; 348/136

[56] References Cited

U.S. PATENT DOCUMENTS

| | | |
|---|---|---|
| 3,187,185 | 6/1965 | Milnes . |
| 3,590,258 | 6/1971 | Shibata et al. . |
| 3,625,618 | 12/1971 | Bickel . |
| 3,685,161 | 8/1972 | MacPherson . |
| 3,709,609 | 1/1973 | Spengler et al. . |
| 3,773,422 | 11/1973 | Stavis et al. . |
| 3,895,870 | 7/1975 | Cullen et al. . |
| 3,918,816 | 11/1975 | Foster et al. . |
| 4,105,925 | 8/1978 | Rossol et al. . |
| 4,111,557 | 9/1978 | Rottenkolber et al. . |
| 4,188,544 | 2/1980 | Chasson . |
| 4,225,238 | 9/1980 | Rottenkolber et al. . |
| 4,249,824 | 2/1981 | Wiederrich et al. . |
| 4,302,104 | 11/1981 | Hunter . |
| 4,335,962 | 6/1982 | De Matteo et al. . |
| 4,373,804 | 2/1983 | Pryor et al. . |
| 4,498,778 | 2/1985 | White . |
| 4,523,844 | 6/1985 | Titsworth et al. . |
| 4,541,721 | 9/1985 | Dewar . |
| 4,598,481 | 7/1986 | Donahue . |
| 4,645,348 | 2/1987 | Dewar et al. . |
| 4,666,303 | 5/1987 | Pior . |
| 4,690,557 | 9/1987 | Wiklund . |
| 4,724,480 | 2/1988 | Hecker et al. . |
| 4,745,469 | 5/1988 | Waldecker et al. . |
| 4,761,749 | 8/1988 | Titsworth et al. . |
| 4,863,266 | 9/1989 | Masuko et al. . |
| 4,889,425 | 12/1989 | Edwards et al. . |
| 4,898,464 | 2/1990 | Thorne et al. . |
| 5,054,918 | 10/1991 | Downing et al. . |

(List continued on next page.)

FOREIGN PATENT DOCUMENTS

| | | |
|---|---|---|
| 2948573 | 11/1979 | Germany . |
| 3216098 | 4/1982 | Germany . |
| 55-107907 | 8/1980 | Japan . |
| 264204 | 5/1985 | Japan . |

*Primary Examiner*—Stephen C. Buczinski
*Attorney, Agent, or Firm*—Reising, Ethington, Barnes, Kisselle, Learman & McCulloch, P.C.

[57] ABSTRACT

A method and apparatus for determining camber and caster of a vehicle wheel in which the camber angle is determined in a manner that accounts for the influence of any existing toe angle. This is accomplished by detecting the displacement of one or more points located fore or aft of the wheel's vertical measurement plane and then making a correction to these displacements to account for influence of the toe angle. The apparatus includes a laser that projects shaped light onto the sidewall of the tire at a location offset from the normal upper measurement position. The shaped light illuminates an offset measurement point on the tire sidewall and an optical sensor detects the reflected image. A computer then determines the location of the measurement point within the two-dimensional image space of the optical sensor. Trigonometric equations utilizing the toe angle are then used to determine the horizontal displacement within the vertical measurement plane of this offset measurement point from the tire center or other reference point. Once this horizontal displacement is known, the camber can be determined mathematically using a known trigonometric relationship. By determining the camber angle at left and right steered toe angle, the caster angle of the wheel can the be determined.

45 Claims, 9 Drawing Sheets

U.S. PATENT DOCUMENTS

| | | |
|---|---|---|
| 5,085,510 | 2/1992 | Mitchell . |
| 5,148,209 | 9/1992 | Subbarao . |
| 5,163,002 | 11/1992 | Kurami . |
| 5,164,823 | 11/1992 | Keeler . |
| 5,172,005 | 12/1992 | Cockran et al. . |
| 5,177,558 | 1/1993 | Hill . |
| 5,208,646 | 5/1993 | Rogers et al. . |
| 5,220,399 | 6/1993 | Christian et al. . |
| 5,231,443 | 7/1993 | Subbarao . |
| 5,243,766 | 9/1993 | Marley et al. . |
| 5,268,731 | 12/1993 | Fuchiwaki et al. . |
| 5,274,433 | 12/1993 | Madey et al. . |
| 5,280,542 | 1/1994 | Ozeki et al. . |
| 5,291,660 | 3/1994 | Koerner . |
| 5,463,463 | 10/1995 | Harvey et al. . |
| 5,532,816 | 7/1996 | Spann et al. . |
| 5,600,435 | 2/1997 | Bartko et al. . |
| 5,731,870 | 3/1998 | Bartko et al. . |

NON-CONTACT METHOD AND APPARATUS FOR DETERMINING CAMBER AND CASTER OF A VEHICLE WHEEL

This application claims the benefit of U.S. Provisional Application No. 60/029,354, Oct. 31, 1996.

FIELD OF THE INVENTION

This invention relates to automobile wheel alignment machines and, more particularly, to optical sensors and wheel alignment measurement techniques used in non-contact wheel alignment machines.

BACKGROUND OF THE INVENTION

As is known by those skilled in the art, the camber of a vehicle wheel can determined using a sensor that determines the position of a measurement point at an upper, center location on the tire sidewall. Camber can then be calculated based upon known trigonometric relationships between that measurement point and at least one other point (such as the tire center). As is also known, the caster of a steerable vehicle wheel can be determined based upon the measured camber values at each of two steered positions. This technique is described by D. B. January in "Steering Axis Geometry and Caster Measurement," SAE Publication No. 850219.

In many wheel alignment machines, camber is calculated using the horizontal distance between the upper measurement point and the tire center or other such measurement point. This camber calculation assumes that these two measurement points both lie within a vertical plane that is perpendicular to the rotational plane of the wheel (i.e., perpendicular to the plane in which any arbitrary point on the wheel moves when the wheel is rotating). This vertical plane will hereinafter be referred to as the "vertical measurement plane."

Given this assumption, it is commonly accepted that the actual upper measurement point must be as close as possible to this vertical measurement plane. Otherwise, the position of the measurement point will be influenced by the toe of the wheel and the calculated camber will be incorrect. Thus, the measurement sensors used in wheel alignment machines are typically designed and are often even calibrated so that, for a wheel set at zero toe, the upper measurement point will be as close as possible to the upper, center position on the wheel (i.e., as close as possible to the vertical measurement plane).

One problem with determining caster based upon camber values is that the measured displacements are small and are typically not much larger than the resolution of measurement. Moreover, the influence of the toe angle on the displacements of the measurement points is increased due to the intentional introduction of specific toe angles during the measurement process. Consequently, the caster measurements are less accurate and less repeatable than is considered desirable.

In many non-contact type measurement sensors, this problem is further aggravated by the fact that the shaped light is projected in a predetermined direction that does not change when the wheel is steered left and right. Thus, when camber is being determined for purposes of caster measurement, the point of impingement of the shaped light (i.e., the measurement point) will vary as the wheel is steered between the two left and right positions. This leads to further inaccuracies in the camber (and, thus, caster) measurement.

SUMMARY OF THE INVENTION

In accordance with the present invention there is provided a method and apparatus for determining camber and caster by a technique that accounts for the influence of any existing toe angle. The apparatus includes a computer connected to a plurality of non-contact measurement sensors, at least one of which includes first and second toe light sources that project shaped light onto a vehicle wheel at respective first and second locations, as well as a third light source that projects shaped light onto the wheel at a third location. The apparatus further includes at least one optical sensor that receives the reflected shaped light and provides the computer with data representative of the received light. The computer is operable to determine the camber angle of the wheel and, in doing so, utilizes the toe angle, which can be determined in a known manner.

The apparatus can be constructed so that the shaped light projected from the third light sources impinges the wheel at a third location that is offset from the vertical measurement plane that extends through the center of the wheel perpendicular to the wheel's rotational plane. Using the toe angle, the computer can then determine an offset distance relating to the distance along an axis between the third location and the center of the wheel. The computer can then use this offset distance in determining the camber angle of the wheel. In this way, the displacement of the measurement point due to the toe angle can be taken into account when determining camber.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENTS

Figure 1:
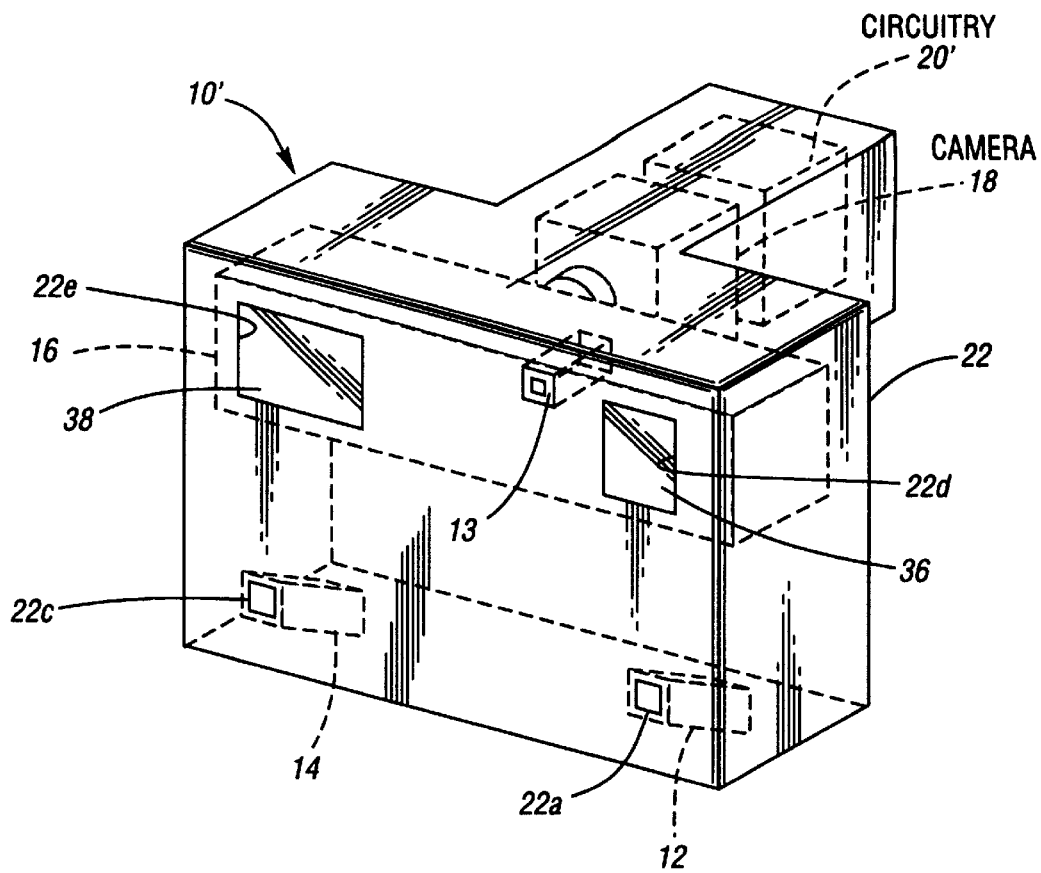
FIG. 1 is a diagrammatic overview of a preferred embodiment of an optical wheel alignment sensor of the present invention.

The sensor and wheel alignment machine method and apparatus of the present invention is an improvement over that disclosed in U.S. Pat. No. 5,600,435, issued Feb. 4, 1997 to R. J. Bartko and J. H. Rosen, the entire disclosure of which is hereby incorporated by reference. Many of the reference numerals used in the drawings of FIGS. 1–15 are the same as those used in the figures of U.S. Pat. No. 5,600,435. Identical numerals identify components that can be the same as that disclosed in that patent. Primed numerals indicate components that are similar to like numbered components of that patent. New numerals identify components not present in the apparatus of that patent. The modifications of the apparatus of that patent that are necessary to implement the invention described below will be apparent to those skilled in the art.

Overview

As noted above, prior art caster measurement techniques that rely upon measured changes in camber between steered positions do not provide a desirable level of accuracy and repeatability because the measured displacements are not much larger than the available resolution of measurement. This limitation of the prior art techniques is avoided by the present invention, which is based upon the recognition that camber can be determined with greater accuracy for a given resolution of measurement by detecting the displacement of one or more points located fore or aft of the vertical measurement plane and then making a correction to these displacements to account for influence of the toe angle.

In accordance with the present invention, camber is determined in a non-contact manner using a laser that projects shaped light onto the sidewall of the tire at a location offset from the normal upper measurement position. The shaped light illuminates an offset measurement point on the tire sidewall and an optical sensor detects the reflected image. A computer then determines the location of the measurement point within the two-dimensional image space of the optical sensor. Trigonometric equations utilizing the toe angle are then used to determine the horizontal displacement within the vertical measurement plane of this offset measurement point from the tire center or other reference point. Once this horizontal displacement is known, the camber can be determined mathematically using a known trigonometric relationship, as will be discussed below.

Determination of camber in this manner can be advantageously utilized as a part of the caster measurement process. In determining caster, the wheel is turned to two (left and right) steered positions to introduce a preselected amount of toe. The shaped light illuminates a measurement point on the tire sidewall at each of these two steered positions. For each steered position, the camber is determined as discussed above, again by taking into account the preselected toe angle. Once the camber angles are determined in this manner at each of the left and right steered positions, the caster is then calculated using the well known equations given by D. B. January in "Steering Axis Geometry and Caster Measurement," SAE Publication No. 850219.

The measured displacements of the offset measurement point are corrected to account for: (1) the actual displacement of the tire center from a calibrated position; and (2) the influence of the toe angle. The first of these corrections can be accomplished in a known manner, as will be described below. The second of these corrections is a toe correction that is calculated from the toe angle and the displacement of the measurement point from the tire center in the vehicle's longitudinal (Y-axis) direction. Once the measured displacement has been corrected, it is used to determined the horizontal displacement in the vertical measurement plane, again using the toe angle. Once this horizontal displacement is known, camber can be calculated using the known trigonometric relationship of this horizontal displacement to the tire's crown radius.

Sensor Construction

A sensor 10' of the present invention is shown in FIG. 1. The sensor of FIG. 1 can be the same as that shown and described in connection with FIG. 1 of U.S. Pat. No. 5,600,435, with the exception of the differences discussed below. One of the primary differences is the relocation and reorientation of laser 13 that is used in determining camber. Laser 13 is positioned to direct a plane of laser light that is parallel to and offset from a vertical reference plane, which as used herein is defined as the vertical measurement plane of a wheel when it is at zero toe. The impingement of this plane of laser light onto sidewall 32a is shown in FIGS. 2 and 3.

Figure 2:
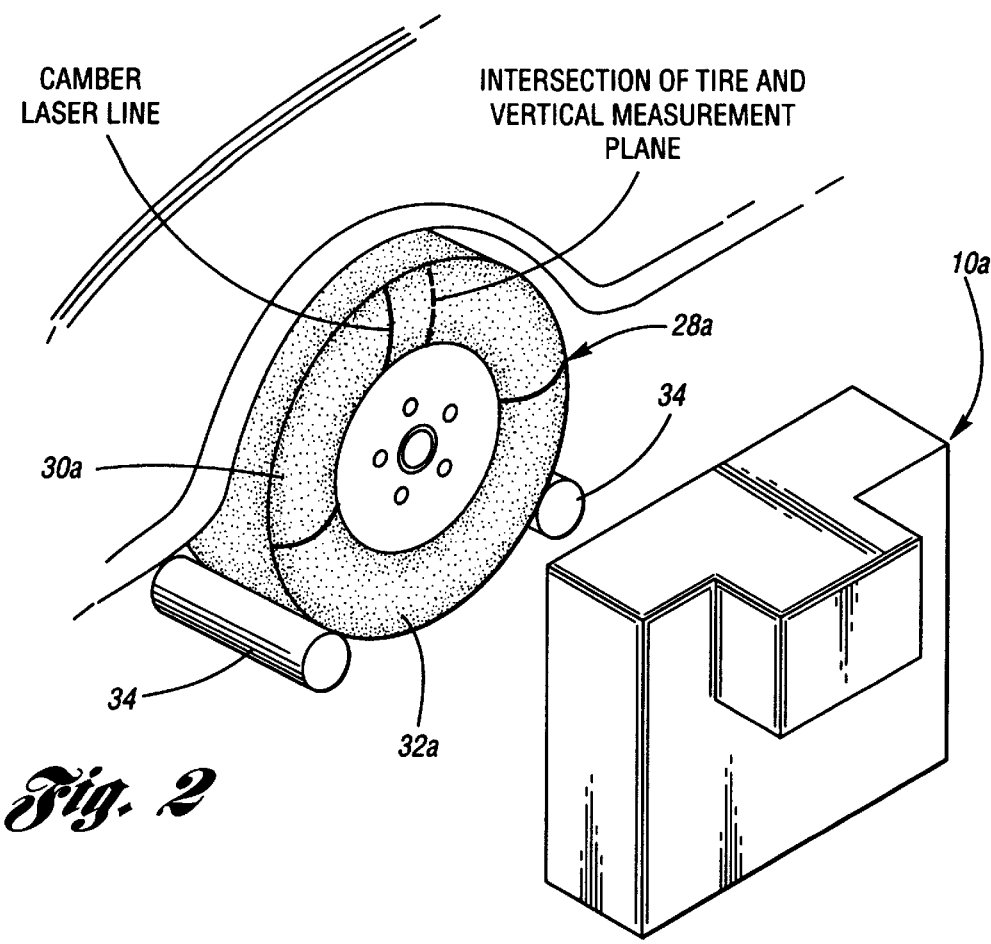
FIG. 2 is a perspective view showing the positioning of the sensor of FIG. 1 relative to the left front wheel of a vehicle and showing the convention used to define the spatial positions of the sensor and wheel for the purposes of measurement of the wheel's alignment characteristics.
Figure 3:
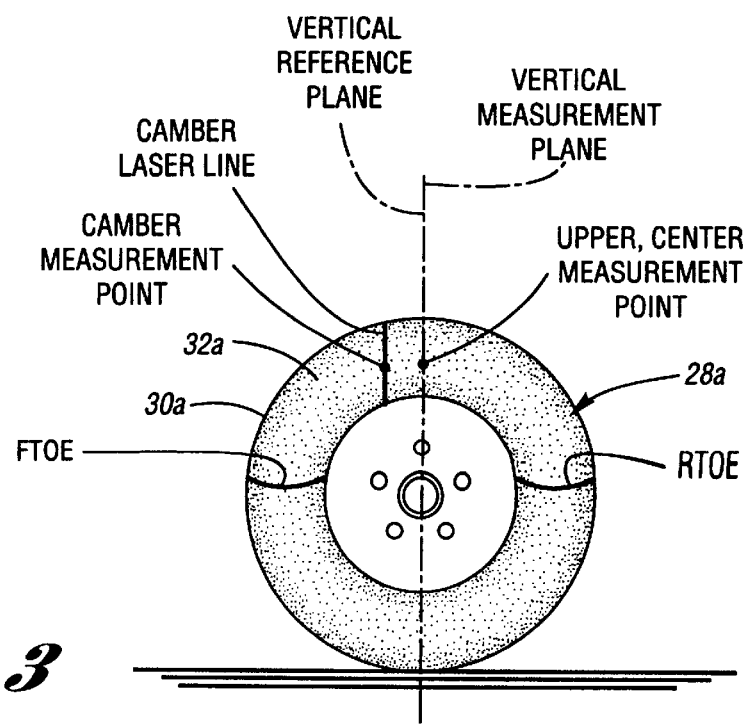
FIG. 3 is a side view of the vehicle's left front wheel showing diagrammatically how lasers within the sensor of FIG. 1 are used to project shaped laser light onto the sidewall of a tire mounted on the wheel.

In particular, FIG. 2 depicts how, for a wheel set at zero toe and camber, the light from laser 13 illuminates a line on tire sidewall 32a at a location that is offset from the intersection of the tire sidewall with the vertical measurement plane. FIG. 3 shows this in additional detail and shows how the offset camber laser line illuminates at least one measurement point at the offset location. As shown in FIG. 3 and as discussed in greater detail below, this measurement point is preferably the crown point of the reflected laser line and is referred to hereinafter as the offset measurement point or camber measurement point. Of course, it will be appreciated that laser 13 can project any other suitable shaped light (as that is defined in the U.S. Pat. No. 5,600,435) in lieu of a line, as long as the position of an appropriate offset measurement point can be determined from the reflected image. FIG. 3 also shows how the position of the offset measurement point differs from that of the upper, center measurement point used in the above-noted prior art camber measurement techniques. Since the wheel of FIGS. 2 and 3 is set at zero toe, the vertical measurement plane is coincident with the vertical reference plane.

To improve the accurate detection of points on the laser line, the camera is rotated 90° in a direction opposite of that described in U.S. Pat. No. 5,600,435. That is, the camera is rotated onto its side, so that the horizontal axis of its image plane is oriented vertically and the left edge of its image plane is closest to the ground. This allows detection of the laser lines using the convex edge of the laser line, which provides a sharper transition. As a result, the reflected laser lines contained in the video image data are reversed from that generated by the sensors described in that patent.

Figure 4:
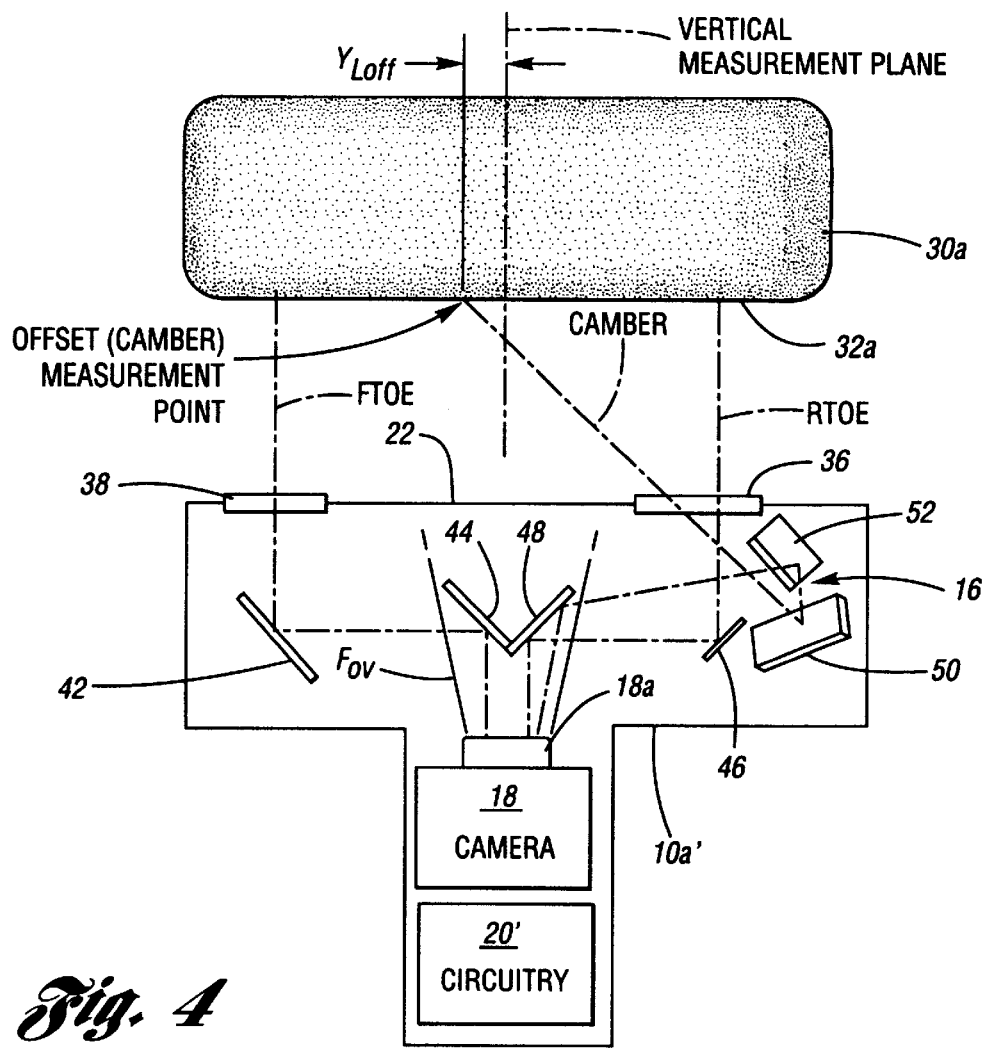
FIG. 4 is a plan view of the wheel and sensor of FIG. 1 showing the sensor optical system.
Figure 5:
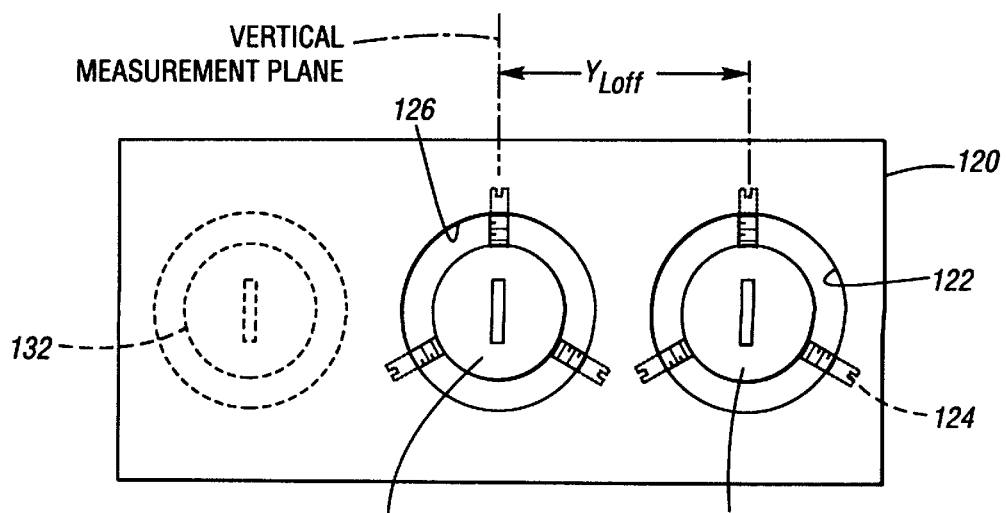
FIG. 5 is a view of the mounting block used for one of the lasers of the sensor of FIG. 1, as well as for another laser used in a second embodiment of the invention.

Referring now to FIG. 5, there is shown a mounting block 120 for laser 13. The mounting block is used to support laser 13 and to permit mechanical calibration of that laser with respect to the master gauge. Mounting block 120 includes a cylindrical bore 122 within which laser 13 is set. Laser 13 is held within its associated bore by three set screws 124 that can be used to adjust the direction and orientation of the laser's projection axis. The center of the bore 122 is offset from the vertical reference plane by a laser offset distance $Y_{LOff}$ that is selected based upon how far the offset measurement point is selected to be from the vertical reference plane. Since laser 13 is mechanically calibrated to project light along an axis parallel to the vertical reference plane, the distance of the offset measurement point on the tire sidewall from the vertical measurement plane for a wheel at zero toe will also be $Y_{LOff}$. This is indicated in FIG. 4. Preferably, this laser offset distance $Y_{LOff}$ is within the range of three-quarters of an inch to one and one-quarter of an inch and, even more preferably, this distance is one inch. Also, as shown in FIG. 4, the offset measurement point and optical system field of view of that measurement point are preferably on opposite sides of the vertical reference plane so that the reflected camber laser line image seen by camera 18 passes through the vertical reference plane.

FIG. 5 also depicts another laser 130 that is centered on and projects its laser light in the vertical reference plane. Thus, it projects its light onto the upper, center measurement point used in prior art sensors. Laser 130 is used solely as part of another embodiment, as will be discussed farther below.

CAMBER MEASUREMENT USING THE OFFSET CAMBER LASER LINE

Figure 6:
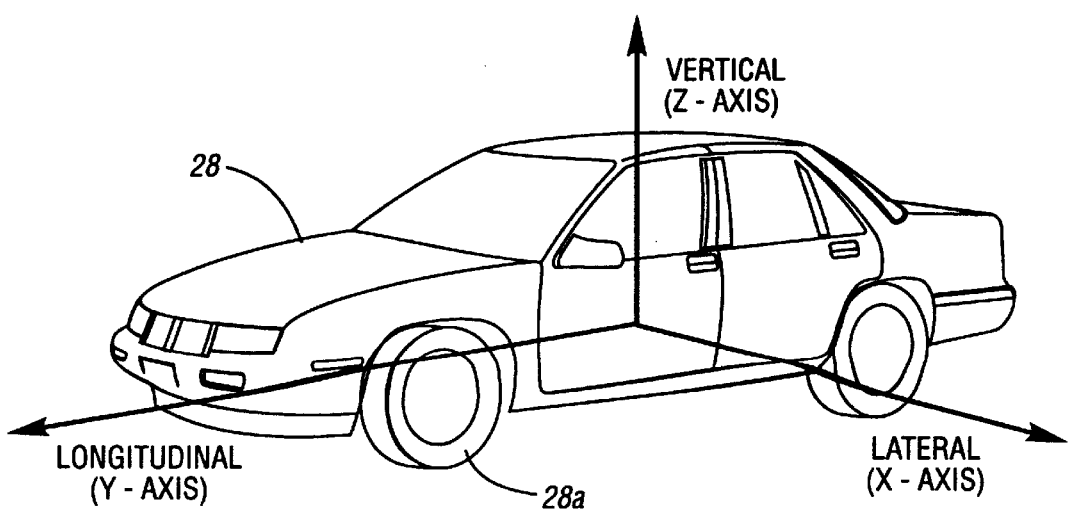
FIG. 6 depicts the convention used to define the orientation of a vehicle undergoing measurement in a wheel alignment machine of the present invention.

FIG. 6 depicts the spatial conventions used herein. Note that, contrary to that used in U.S. Pat. No. 5,600,435, the longitudinal (fore and aft) direction is taken to be the Y-axis, the lateral direction is taken to be the X-axis, and the vertical direction to be the Z-axis. Thus, the vertical reference plane is the X-Z plane and, for any particular wheel, the vertical measurement plane will intersect the vertical reference plane at an angle equal to the toe angle of the wheel.

The following description of camber measurement will be made with reference to the front, left wheel of the vehicle. As will be understood by those skilled in the art, the toe values utilized in the camber measurement process are actual toe values that have been adjusted in a known manner to account for the thrust angle and the degree to which the vehicle is skewed in the test rig.

Figure 7:
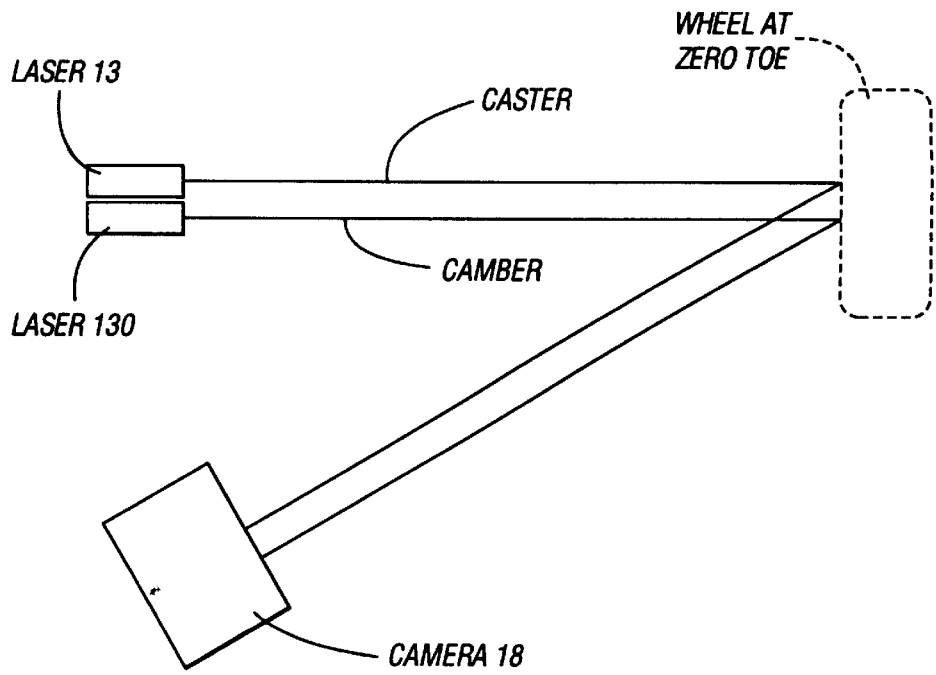
FIGS. 7 and 8 are top views showing the projection of laser light from the sensor of FIG. 1.
Figure 8:
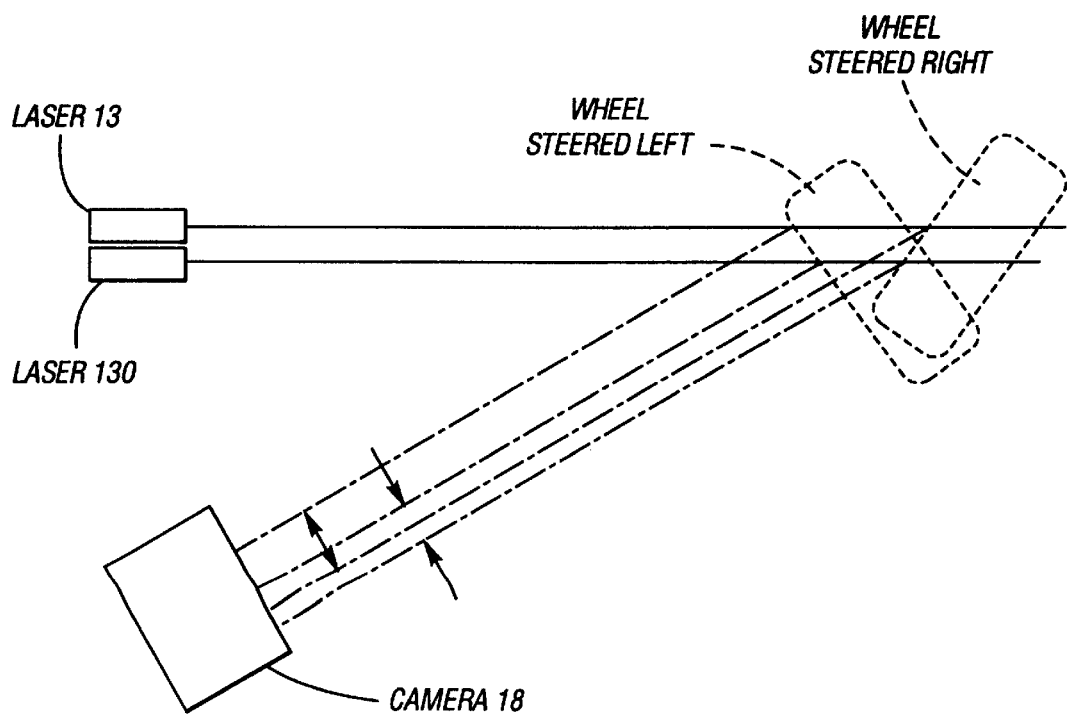

As mentioned above, by projecting shaped light onto the tire sidewall at a location offset from the upper, center position normally utilized for camber determination, greater displacements of the measurement point can be obtained at each of the two steered positions, thereby permitting more accurate caster measurement. The effect of this offset location can be understood by reference to FIGS. 7 and 8. FIGS. 7 and 8 are top views showing the projection of shaped light by offset laser 13 in comparison with light projected by laser 130 onto the upper, center measurement point used by prior art techniques. It should be noted that these two figures are provided only for the purpose of illustrating one of the principles of operation of sensor 10'. Thus, it will be appreciated that sensor 10' does not include laser 130 and the reflected shaped light from laser 13 is received by optical system 16, rather than directly by camera 18 as indicated in FIGS. 7 and 8.

FIG. 7 shows the vehicle wheel at zero toe. In FIG. 8, the wheel has been steered left and right to two toe angles, which are exaggerated only for the purpose of illustration. As the small arrows indicate, the change in position within the camera's image plane of the reflected laser light is greater for offset laser 13 than for laser 130. By measuring such larger displacements, the error in measurement can be reduced and the repeatability of measurement increased.

Camber Calculations

Figure 9:
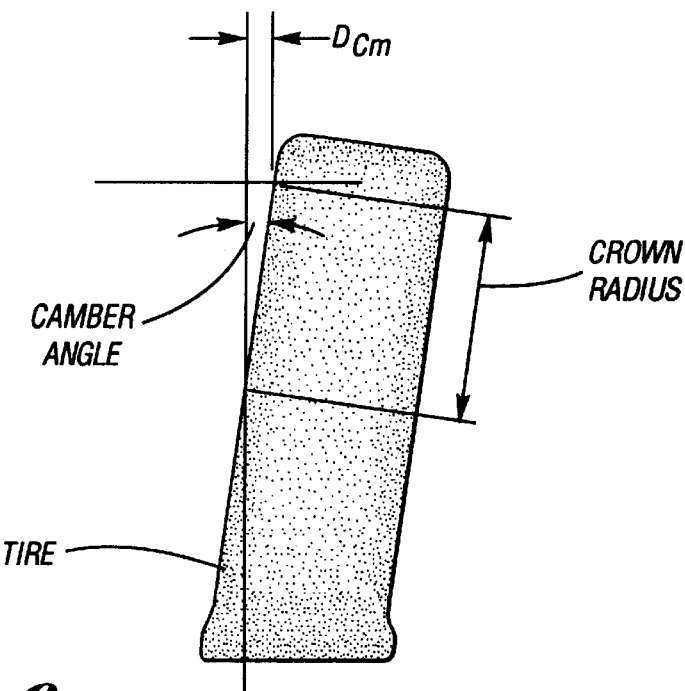
FIG. 9 is a view of a vehicle wheel showing the relationship between camber and the crown radius of the wheel.

The derivation of the camber equation that is utilized by the illustrated embodiment can be understood by reference to FIG. 9. The front, left wheel is shown in that FIG. 1s having a positive camber angle. As that FIG. 4epicts:

$$\text{Camber} = \theta_{Cm} = \sin^{-1}(D_{Cm}/R)$$

where:

$D_{Cm}$=the horizontal distance in the vertical measurement plane between the upper, center measurement point and tire center; and R=the crown radius in millimeters (i.e., the distance from the tire center to the crown of the tire).

The crown radius is a constant and, if not determined using the measured data, is available from the tire manufacturer. When determining camber using the upper, center measurement point, determination of $D_{Cm}$ is relatively straight forward—it is simply the displacement of the measurement point from the calibration point in the X-direction plus an adjustment to account for the tire center not being at the calibrated position in the X-direction. This adjustment is equal to the average displacement of the toe laser lines from their calibration points in the X-direction. This is shown by FIGS. 13A and 13B of U.S. Pat. No. 5,600,435, where $X_c$ equals the displacement of the measurement point from the calibration point and $Y_d$ is the average X-axis displacement of the measurement points from their calibrated positions.

When determining camber using the offset laser 13, proper determination of $D_{Cm}$ requires that the measured displacement in the X-direction be corrected not only to account for the displacement of the tire center from the assumed calibrated position, but also to account for the influence of the toe angle. Then, the corrected X-axis displacement and toe angle are used to determine the horizontal distance $D_{Cm}$, as will be described in greater detail below.

Toe Calculations

Figure 10:
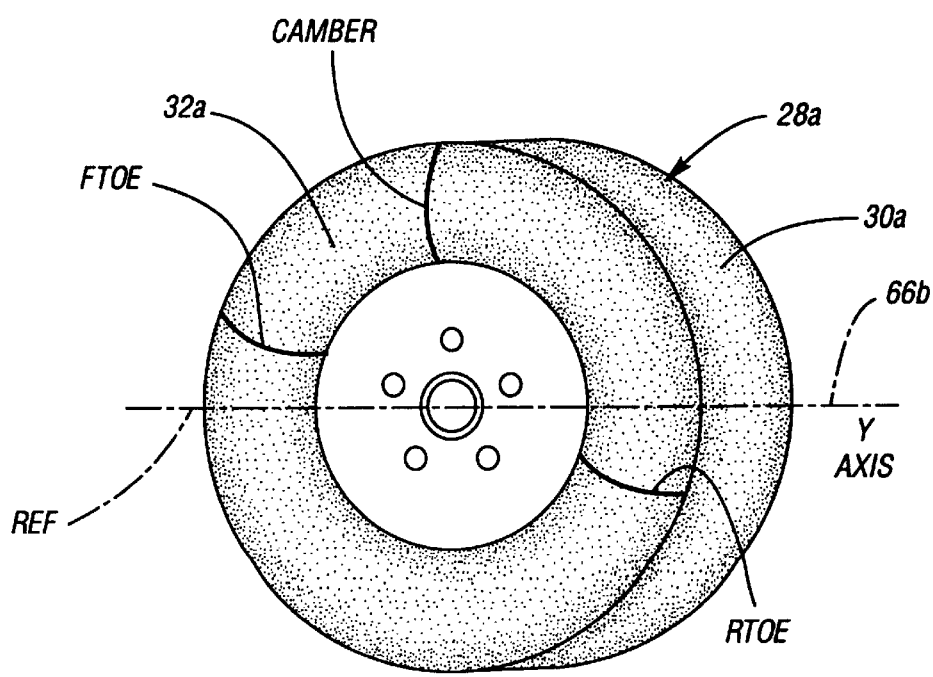
FIG. 10 is a side view of the wheel of FIG. 2 showing how the wheel's toe angle effects the location at which the shaped light hits the tire's sidewall.
Figure 11:
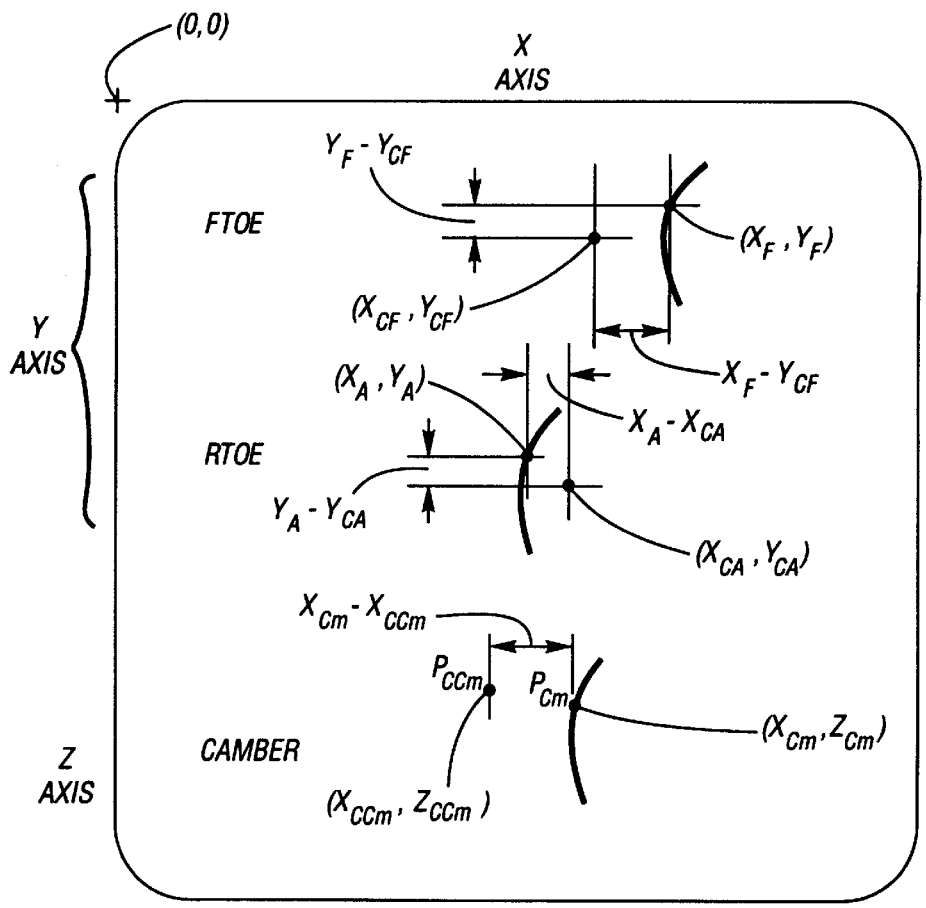
FIG. 11 shows the effect of toe on the relative and absolute locations of the reflected shaped light within the image generated by the sensor camera.

Calculation of the toe angle can be understood by reference to FIGS. 10 and 11. FIG. 10 depicts the affect of a positive toe angle on the reflected forward and rearward toe laser lines (FTOE and RTOE). The resulting displacements of the reflected toe laser lines within the camera's image plane is shown in FIG. 11. That FIG. 11so shows the effect of a positive camber on the offset laser line. As indicated in FIG. 11, movement of the toe laser lines to the left and right in the image plane of the camera is treated in software as movement of the laser lines in the vehicle's lateral (X-axis) direction. Movement of the toe laser lines in an up and down direction within the camera's image plane is treated in software as movement in the vehicles longitudinal (Y-axis) direction. For offset laser 13, movement of the camber laser line to the left and right within the camera's image plane is treated in software as movement of that laser line in the vehicle's lateral (X-axis) direction, while movement of that laser line in the up and down direction is treated in software as movement of the laser lines in the vertical (Z-axis) direction.

Accordingly, the toe angle can be calculated in a manner similar to that described above for camber; namely:

$$\text{Toe} = \theta_T = \tan^{-1}(S_T \Delta X_T/2R)$$

where:

$\Delta X_T$=the distance (in pixels) along the X-axis between the crown points illuminated by the FTOE and RTOE laser lines; and $S_T$=a pixel to millimeter scale factor that is dependent upon the angle between the projected laser light and reflected laser light received by the camera.

Although the reflected toe laser lines are both within the camera's image plane, they come from different fields of view that have been merged together using optical system 16. Accordingly, they must be spatially referenced to each other. This is accomplished mechanically using a master gauge (or buck), as discussed in U.S. Pat. No. 5,600,435. Although lasers 12–14, optical system 16, and camera 18 can all be adjusted as discussed in that patent so that they are calibrated to a single, common reference, it will be appreciated that such alignment of the devices is not necessary. Rather, it is sufficient that the individual calibration points for each of the laser lines is found and recorded during calibration and used with their respective laser lines during measurement. This is shown in FIG. 11.

By referencing the measured forward and rearward toe laser lines to individual calibration points that are mechanically referenced to each other, the determination of $\Delta X_T$ simply becomes:

$$\Delta X_T = (X_F - X_{CF}) - (X_A - X_{CA}).$$

Once the toe value has been calculated, a symmetry correction is applied in a known manner to account for degree to which the vehicle is skewed in the test rig. The toe value is further adjusted in a known manner to account for the thrust angle of the vehicle.

Determination of the Crown Points

Figure 12:
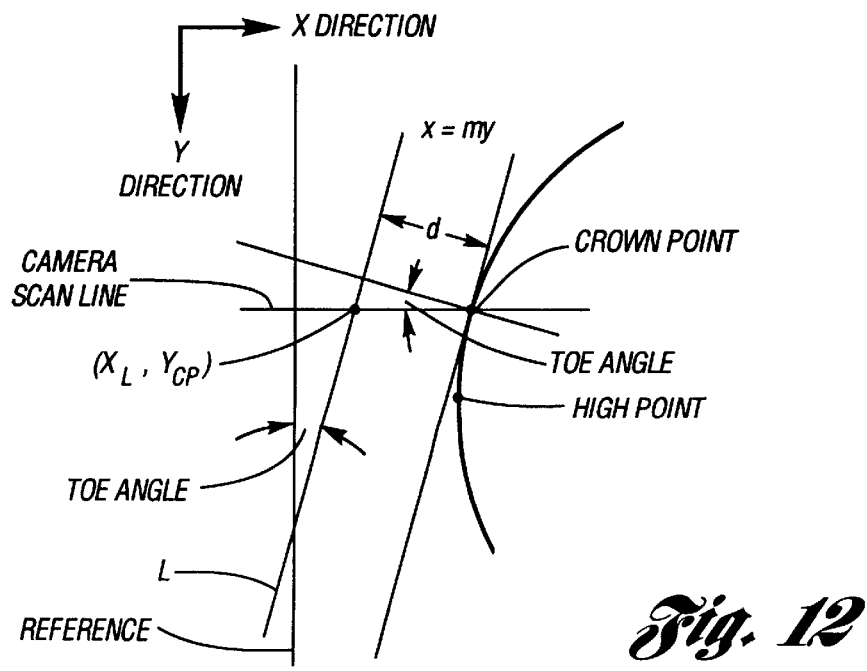
FIG. 12 depicts the affect of toe angle on the location of the measurement point relative to the crown point of the tire shown in FIG. 2.

As mentioned above, toe and camber are determined based upon the X-axis displacement of selected crown points of the tire. As used herein, the "crown point" of a particular laser line refers to the illuminated point on the tire sidewall that is farthest from the rotational plane (which is assumed to be centered between the tire's two sidewalls). As shown in FIG. 12, this crown point is typically different than the high point utilized in the method and apparatus of U.S. Pat. No. 5,600,435. For the reflected offset laser line, these two points will be the same only if the wheel is set at zero toe and zero camber.

With continued reference to FIG. 12, determination of the location of the crown point in the camera's image plane is accomplished by using the toe angle. The toe angle is used to define an inclined line L relative to an arbitrary reference running parallel to the Y-axis. This line can be defined simply by the equation:

$$x = y \tan \theta_t$$

where:

$\theta_T$=the toe angle.

The crown point is that point on the laser line that is closest to line L. The closest point can be determined by calculating the distance d for each point on the laser line, as follows. For each scan line of the camera, when a point on the laser line is detected, the Y-coordinate ($Y_P$) of that point within the image plane is substituted into the equation given above for line L, thereby resulting in the X-coordinate ($X_L$) of the point of intersection of the scan line with line L. The distance d can then be simply calculated using the following equation:

$$d = (X_P - X_L) \cos \theta_T$$

where:

$X_P$=the X-coordinate of the point ($X_P, Y_P$) being examined on the scan line.

The point on the laser line for which the distance d is the smallest is the crown point of the tire.

Since the crown points are used in calculating the toe angle and the toe angle is used to determine the location of the crown points, these calculations are performed iteratively, with the crown points being determined initially by assuming a zero toe angle. These calculations are performed for each new frame of video data, with the crown points being determined using the toe angle calculated for the previous video frame and a new toe angle being calculated once an updated set of crown points are found.

Determination of Camber

Figure 13:
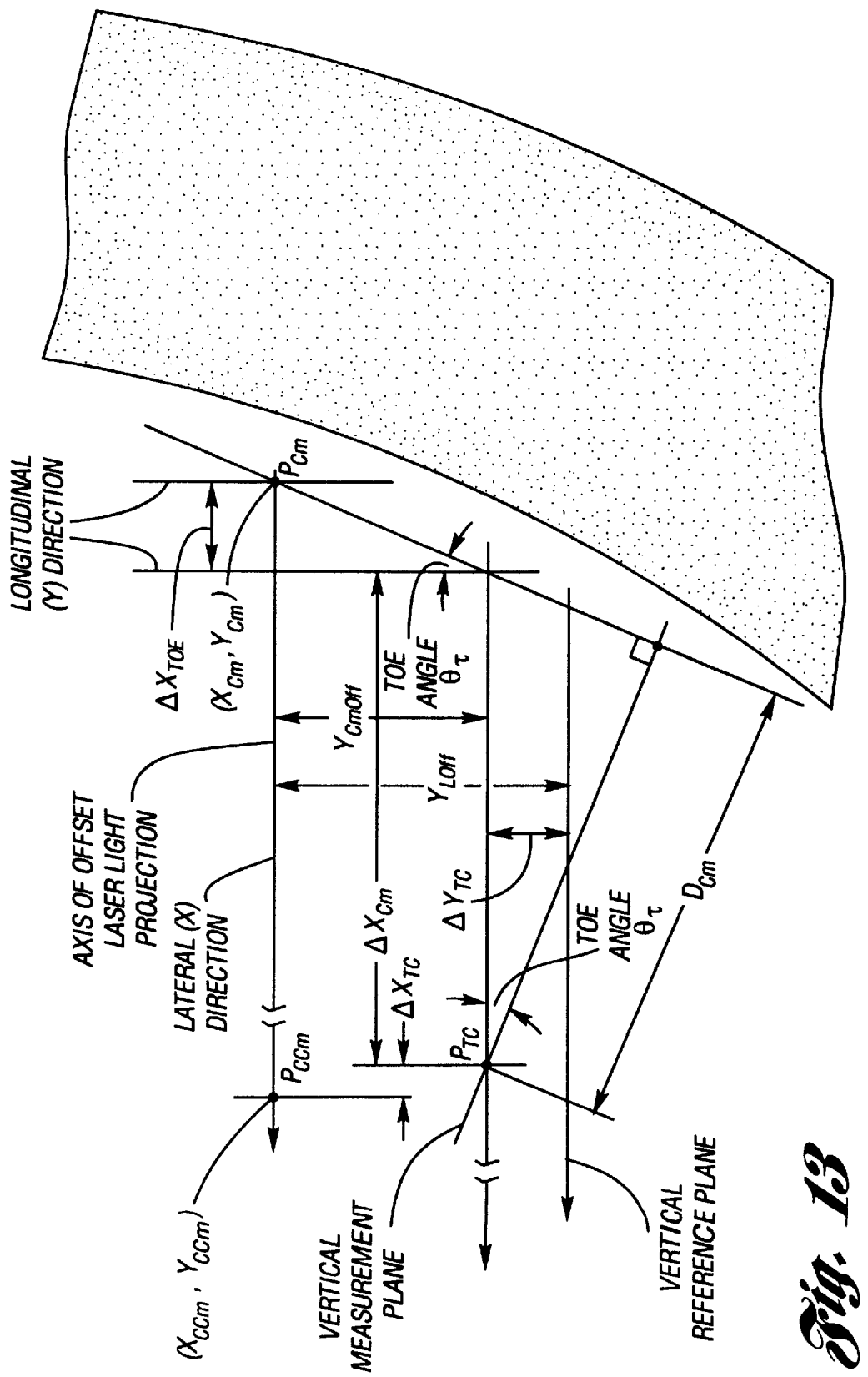
FIG. 13 is a partial top view of the tread and sidewall of the tire shown in FIG. 2.

Referring now to FIG. 13, the derivation of the equations for calculating camber using the offset measurement point will now be described. FIG. 13 is a partial top view of the tread and sidewall of a left, front wheel that has a positive camber and caster angle and that also has a positive toe angle (whether as the actual toe of the tire or as a result of being steered to that toe angle for the purpose of caster measurement). Offset laser 13 projects in the lateral (X-axis) direction, thereby illuminating a vertically oriented line of laser light on the sidewall of the tire. This laser line illuminates the offset (camber) measurement point $P_{Cm}$. As discussed above, the equation used to determine camber is as follows:

$$\text{Camber} = \theta_{Cm} = \sin^{-1}(D_{Cm}/R)$$

The horizontal distance ($D_{Cm}$) is the horizontal distance in the vertical measurement plane between the tire center and camber measurement point. Since the vertical measurement plane is inclined from the X-axis by the toe angle, $D_{Cm}$ can be calculated as follows:

$$D_{Cm} = S_{Cm} \Delta X_{Cm} \cos \theta_T$$

where:

$S_{Cm}$=a pixel to millimeter scale factor that is dependent upon the angle between the projected laser light and reflected laser light received by the camera; and $\Delta X_{Cm}$=the X-axis displacement of the camber measurement point from the tire center.

By inspection of FIG. 13, it will be understood that:

$$\Delta X_{Cm} = X_{Cm} - X_{CCm} - \Delta X_{Toe} - \Delta X_{TC}$$

where:

$X_{Cm}$=the X-axis pixel coordinate of the camber measurement point $P_{Cm}$ within the camera's image plane;

$X_{CCm}$=the X-axis pixel coordinate of the calibrated point $P_{CCm}$ for the offset camber laser line;

$\Delta X_{Toe}$=a toe correction equal to the displacement of the camber measurement point along the X-axis due to the effects of the toe angle; and $\Delta X_{TC}$=the X-axis displacement of the tire center from the assumed calibrated position.

Referring briefly to FIG. 11, it will be appreciated that $X_{CCm}$ is a known value (as a result of calibration with the master gauge) and that $X_{Cm}$ can be found using the crown point detection technique described above.

With continued reference to FIG. 13, it will be appreciated that the toe correction $\Delta X_{Toe}$ can be determined using the previously determined toe value and the Y-axis offset distance $Y_{CmOff}$ which equals the Y-axis (longitudinal) distance between the offset measurement point and the tire center, as follows:

$$\Delta X_{Toe} = Y_{CmOff} \tan \theta_T$$

Determination of this Y-axis offset is accomplished as follows. The master gauge has the fore and aft toe calibration points set to be exactly the same distance in the Y-direction from the vertical reference plane. During initial set-up and calibration of the sensor, offset laser 13 is positioned so that, in the Y-direction, it projects light in a plane that is at a known laser offset distance ($Y_{LOff}$) from the vertical reference plane. Thus, since the offset $Y_{LOff}$ of the camber laser projection axis from the vertical reference plane is known, the Y-axis offset distance $Y_{CmOff}$ can be determined by reference to the vertical reference plane, as follows:

$$Y_{CmOff} = Y_{LOff} + \Delta Y_{TC}$$

where:

$\Delta Y_{TC}$ = the Y-axis displacement of the tire center from the vertical reference plane Referring again briefly to FIG. 11, it will be appreciated that $\Delta Y_{TC}$ is equal to the average Y-axis displacement of the measured toe crown points from their calibrated positions. That is:

$$\Delta Y_{TC} = [(Y_F - Y_{CF}) + (Y_A - Y_{CA})]/2,$$

which, in the present instance will yield a negative number, resulting in $Y_{CmOff}$ being smaller than $Y_{LOff}$.

Determination of $\Delta X_{Cm}$ also requires determination of the X-axis displacement $\Delta X_{TC}$ of the tire center from its assumed calibrated position. As with the determination of the Y-axis displacement of the tire center, $\Delta X_{TC}$ can be determined simply be averaging the X-axis displacements of the toe crown points from their calibrated positions, as follows:

$$\Delta X_{TC} = [(X_F - X_{CF}) + (X_A - X_{CA})]/2$$

Now that the toe correction $\Delta X_{Toe}$ and tire center offset $\Delta X_{TC}$ have been determined, the X-axis displacement $\Delta X_{Cm}$ can easily be computed and, from that, the horizontal distance $D_{Cm}$ using the equation given above. Once this horizontal distance is known, it can be used in the camber equation given above along with the known crown radius R of the tire to calculate the camber angle of the wheel.

Determination of Caster

As explained in the above-noted article by D. B. January, caster can be determined using the camber value at each of two steered toe angles. Thus, the camber technique just described can be used to determine the camber at equal left and right steered toe angles and the caster then calculated in a known manner using those camber values.

Pixel-to-Millimeter Conversion

Figure 14:
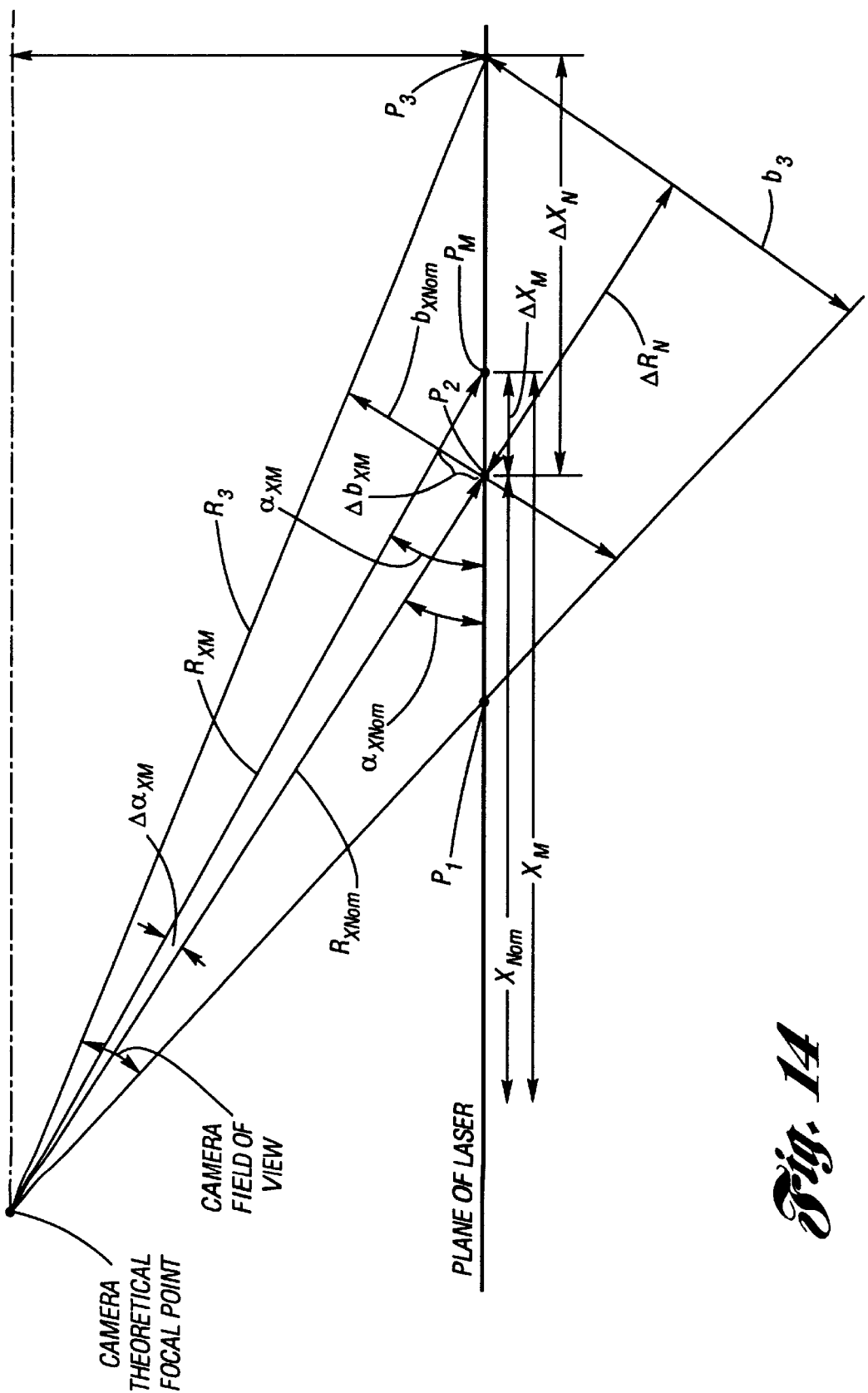
FIG. 14 depicts how the scaling of pixels to millimeters is affected by the angle between the axis of projection and of laser light and the axis of reflected laser light seen by the camera.

Conversion of pixel distances in the camera's image plane to actual distances (e.g., millimeters) can be accomplished using the scale factor (S) discussed above in connection with the equations. However, as shown in FIG. 14, the actual scaling of pixels to millimeters changes with the angle between the axis of projection of laser light and the axis of reflected light seen by the camera. Thus, the actual displacement along the X-axis from point $P_1$ to $P_2$ is less than the displacement from point $P_2$ to $P_3$, even though the displacement ($b_{Nom}/2$) seen by camera 18 is the same. Thus, the single scale factor used in the equations above cannot truly represent displacements in the X-direction.

In accordance with another aspect of the invention, rather than use the scale factors in the equations above, the pixel coordinate of each measured point (i.e., both the calibration and crown points) is converted to an actual displacement relative to a nominal (center of field of view) position $P_2$ using the known angle between the axis of projection of laser light and the axis of the nominal position. Then, the same equations given above (without the scale factor S) are used to calculate camber and, if desired, caster.

Appendix A provides the derivation of the equations used for determining the actual X-axis displacement of a measured point $P_M$ relative to a point $P_2$ at the intersection of the laser's axis of projection and the center of the camera's field of view. Those calculations assume that: (1) $R_{XNom}$ falls on the center of the camera's field of view; (2) that $b_{XNom}$ is the extent of the camera field of view measured perpendicular to $R_{XNom}$ at point $P_2$; (3) that $b_3$ is measured perpendicular to $R_{XNom}$ at point $P_3$ which is a known (measured) distance $\Delta X_N$ along the plane of the laser light; and (4) the set-up angle $\alpha_{XNom}$ is known. These values can be measured as a part of calibration and set-up of measurement sensor 10'.

As indicated by the final equation of Appendix A, the actual X-axis displacements in millimeters or other engineering units can be expressed as a function of the pixel displacement ($\Delta Pixel_X$) and various other constants that can be determined as a part of initial machine calibration and set-up. These equations can similarly be used to compute actual displacements in the Y and Z-axes.

INCORPORATION OF SENSOR 10' INTO A WHEEL ALIGNMENT MACHINE

Figure 15:
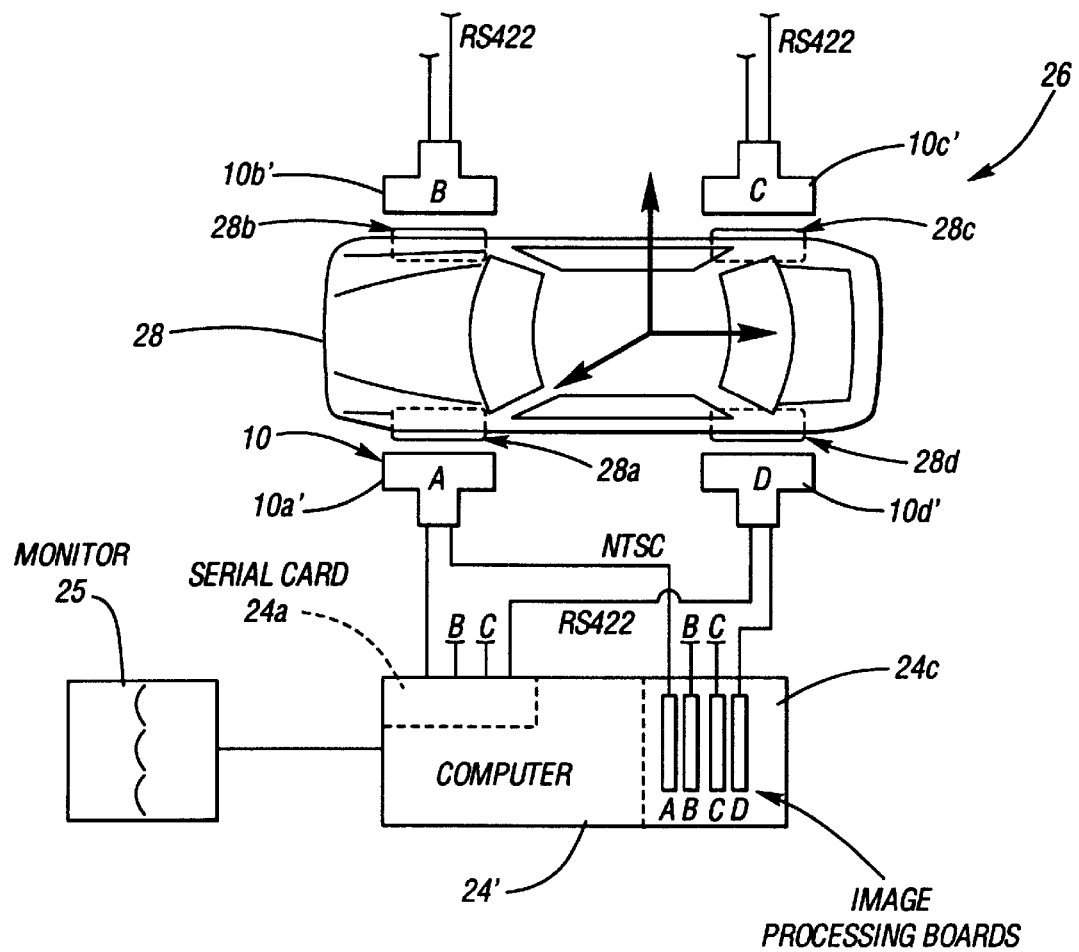
FIG. 15 is a diagrammatic plan view of a wheel alignment machine that includes four of the optical wheel alignment sensors of FIG. 1.

Referring now to FIG. 15, a wheel alignment machine constructed in accordance with the present invention is shown. The wheel alignment machine can be generally the same as that shown and described in connection with FIG. 2 of U.S. Pat. No. 5,600,435, except that the image processing of the camera video data need not be carried out by the circuitry disclosed in FIG. 14 of that patent. Rather, the video data from camera 18 can be sent directly to computer 24 and, more particularly, to individual image processing boards A, B, C, and D installed in a portion 24c of the computer. A suitable image processing board for this application can be a 4MEG VIDEO Model 12 image processing board equipped with a 4M12 COC402 board, both of which are available from Epix, Inc. of Buffalo Grove, Ill.

Circuitry 20' comprises control electrical interface circuitry that interfaces between camera 18 and computer 24. This interface includes the circuitry necessary to convert the electrical signals sent by computer 24 (for setting camera parameters such as camera gain, brightness, and video scan mode) to appropriate levels, as required by the camera's interface circuitry.

As will be appreciated, the image processing boards utilize known techniques for determining the position within the camera's image plane of the various points utilized in the equations given above. The different calculations used to determine the toe, camber, and caster angles are carried out by the computer using the data received from the sensors.

Preferably, the configuration of laser, camera, and optical components of the right, front sensor is a mirror image of that described above for the front, left wheel. That is, for the right, front sensor 10b', laser 13 is offset in the rearward (aft) direction and the reflected laser light that is received by the camera enters optical system 16 near the forward end of the measurement sensor.

DUAL—CAMBER LASER EMBODIMENT #1

In another embodiment, laser 13 is used only for caster measurement and a fourth laser is used to determine the wheel's camber angle in accordance with the above-noted prior art camber measurement technique. Thus, as shown in FIG. 5, a fourth laser 130 would be located within a second cylindrical bore 126 and would be mechanically positioned to project laser light within the vertical reference plane.

In this embodiment, only one of the lasers 13 and 130 would be operated at a time to project laser light, since, as shown in FIG. 4, the two reflected camber laser lines would be directed by optical system 16 into the same general region of camera 18. Since the normal sequence of operation of a wheel alignment machine is to measure camber and caster separately (i.e., measure one first, and then begin a separate series of steps to measure the other), only one of these two laser lines need be projected at a time. This avoids the necessity of having to distinguish two reflected shaped light images from each other that occupy the same region within the camera's image plane. Accordingly, in this embodiment, circuitry 20' includes a switching circuit that utilizes a solid state or electronically-controlled mechanical relay to switch operating power to only one of the lasers 13 and 130 at a time. Thus, in the camber measurement mode, the switching circuit is used to provide operating power to laser 130 and not laser 13. Conversely, in the caster measurement mode, the switching circuit is used to provide operating power to laser 13 and not laser 130.

DUAL—CAMBER LASER EMBODIMENT #2

In yet another embodiment, camber (whether for purposes of caster or for its own sake) is determined using two offset lasers. In this embodiment, the second offset laser can be used to measure displacements of a second measurement point to further increase the accuracy of camber measurement. For example, a second offset laser 132 could be located on the opposite side of the vertical reference plane, as shown in phantom in FIG. 5.

It will thus be apparent that there has been provided in accordance with the present invention a non-contact wheel alignment method and apparatus which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

We claim:

1. In a non-contact wheel alignment machine for use in determining one or more wheel alignment characteristics of a vehicle, said wheel alignment machine having a computer and a plurality of non-contact measurement sensors electrically connected to said computer, wherein at least one of said measurement sensors includes:
   first and second toe light sources that project shaped light onto a sidewall of a tire of one of the vehicle's wheels at respective first and second locations;
   a third light source that projects shaped light onto the sidewall of the tire at a third location; and
   an optical sensor system having one or more fields of view that includes said first, second, and third locations; and
   wherein said computer is operable under control of a program and in response to data from said optical sensor system to determine a toe angle and a camber angle associated with the tire;
   wherein the improvement comprises:
   said computer being operable under control of said program to utilize said toe angle in determining said camber angle.

2. A non-contact wheel alignment machine as defined in claim 1, wherein said computer is operable under control of said program to use said toe angle to determine a horizontal displacement within a vertical measurement plane that extends through the center of the wheel perpendicular to the wheel's rotational plane.

3. A non-contact wheel alignment machine as defined in claim 1, wherein at least two of said light sources utilize a single laser to generate said shaped light.

4. A non-contact wheel alignment machine as defined in claim 1, wherein said shaped light comprises a plane of light that illuminates a line on said wheel.

5. A non-contact wheel alignment machine as defined in claim 1, wherein said optical sensor system comprises a single electronic camera having a field of view that includes said first, second, and third locations, whereby portions of the shaped light that are reflected off the tire at each of said locations are received by said camera as a single image.

6. A non-contact wheel alignment machine as defined in claim 4, wherein said optical sensor system further comprises a system of optical elements oriented relative to said camera to provide said camera with said field of view.

7. A non-contact wheel alignment machine as defined in claim 1, wherein said optical sensor system comprises a plurality of electronic cameras, each positioned to have a field of view that includes at least one of said locations on said wheel.

8. A non-contact wheel alignment machine as defined in claim 7, wherein said light sources and said optical system together comprise three sensor modules, wherein each of said sensor modules has a laser and electronic camera.

9. In a non-contact wheel alignment machine for use in determining one or more wheel alignment characteristics of a vehicle, said wheel alignment machine having a computer and a plurality of non-contact measurement sensors electrically connected to said computer, wherein at least one of said measurement sensors includes:
   first and second toe light sources that project shaped light onto a sidewall of a tire of one of the vehicle's wheels at respective first and second locations;
   a third light source that projects shaped light onto the sidewall of the tire at a third location; and
   an optical sensor system having one or more fields of view that includes said first, second, and third locations; and
   wherein said computer is operable under control of a program and in response to data from said optical sensor system to determine a toe angle and a camber angle associated with the tire;
   wherein the improvement comprises:
   said third location being offset from a vertical measurement plane that extends through the center of the wheel perpendicular to the wheel's rotational plane,
   said computer being operable under control of said program to determine an offset distance relating to the distance between said third location and the center of the wheel; and
   said computer being operable under control of said program to utilize said offset distance in determining said camber angle.

10. A non-contact wheel alignment machine as defined in claim 9, wherein said measurement sensor has a longitudinal reference axis extending generally parallel to a longitudinal axis of the vehicle and wherein said offset distance is equal to the distance along the longitudinal reference axis between said third location and the center of the wheel.

11. A non-contact wheel alignment machine as defined in claim 9, wherein said computer is operable under control of said program to utilize said offset distance and said toe angle in determining said camber angle.

12. A non-contact wheel alignment machine as defined in claim 9, wherein said computer is operable under control of said program to use said toe angle to determine a horizontal displacement within said vertical measurement plane.

13. A non-contact wheel alignment machine as defined in claim 9, wherein said computer is operable under control of said program to determine one or more distances relative to a vertical reference plane of said measurement sensor, and wherein said third location is spaced from said vertical reference plane by a preselected distance.

14. A non-contact wheel alignment machine as defined in claim 13, wherein said computer is operable under control of said program to determine a displacement between the tire center and said vertical reference plane and to utilize said preselected distance and said displacement to determine said offset distance.

15. A non-contact wheel alignment machine as defined in claim 13, wherein said preselected distance is between three-quarters of an inch and one and one quarter of an inch.

16. A non-contact wheel alignment machine as defined in claim 15, wherein said preselected distance is approximately one inch.

17. A non-contact wheel alignment machine as defined in claim 13, wherein said third location is on one side of said vertical reference plane and, wherein shaped light reflected from said offset location and sensed by said optical sensor system passes through said vertical reference plane.

18. A non-contact wheel alignment machine as defined in claim 13, further comprising a fourth light source that projects shaped light onto said wheel at a fourth location that is offset from said vertical measurement plane, wherein said vertical measurement plane extends between said third and fourth locations.

19. A non-contact measurement sensor for use in determining one or more wheel alignment characteristics of a tire on a vehicle, comprising:
   first and second toe light sources that project shaped light onto a sidewall of the tire at respective fore and aft locations;
   a third light source that projects shaped light onto said wheel at an upper location;
   a fourth light source that projects shaped light onto said wheel at an offset location that is adjacent said upper location; and
   an optical sensor system having one or more fields of view that includes said fore, aft, upper, and offset locations.

20. A non-contact measurement sensor as defined in claim 19:
   wherein said third and fourth light sources are operable in first and second modes;
   wherein said upper location is illuminated by said shaped light and said offset location is unilluminated by shaped light when in said first mode; and
   wherein said offset location is illuminated by said shaped light and said upper location is unilluminated by shaped light when in said second mode.

21. A non-contact measurement sensor as defined in claim 19:
   wherein said sensor has first and second operating modes;
   wherein said camera is operable to generate data representing the shaped light reflected from said fore, aft, and upper locations when said measurement sensor is in said first mode, and
   wherein said camera is operable to generate data representing the shaped light reflected from said fore, aft, and offset locations when said measurement sensor is in said second mode.

22. A non-contact measurement sensor as defined in claim 19, wherein said third and fourth light sources each comprises a separate laser having a supply power input for receiving operating power for said laser;
   wherein said measurement sensor further comprises a circuit coupled to said supply power inputs, said circuit being operable in a first mode to supply operating power only to one of said power inputs and being operable in a second mode to supply operating power to only the other of said power inputs.

23. A method of calculating the camber angle of a wheel of a vehicle using a measurement sensor that includes an optical sensor having a field of view and one or more light sources for projecting shaped light onto the wheel, the method comprising the steps of:
   illuminating a measurement point on the wheel using shaped light projected onto the wheel at a first location that is offset to one side of a vertical measurement plane that extends through the center of the wheel and generally perpendicular to the rotational plane of the wheel,
   sensing a portion of the shaped light reflected from the first location and generating data representative of the location of the measurement point,
   obtaining a toe angle for the wheel,
   determining the position of a camber reference point in at least one dimension,
   using the toe angle to determine the horizontal displacement within the vertical measurement plane of the measurement point from the camber reference point, and
   calculating the camber angle of the wheel using the horizontal displacement.

24. The method of claim 23, wherein the camber reference point is the center of the wheel.

25. A method of determining one or more alignment characteristics of a wheel of a vehicle using a measurement sensor that includes an optical sensor and one or more light sources for projecting shaped light onto the wheel, the method comprising the steps of
   (a) illuminating a portion of the wheel using shaped light projected onto the wheel at an upper location that is offset to one side of a vertical measurement plane which extends through the center of the wheel,
   (b) sensing a portion of the shaped light reflected from the upper location and generating position data that corresponds to an offset measurement point located at the upper location,
   (c) obtaining a toe angle for the wheel, and
   (d) determining a camber angle for the wheel using the position data and toe angle.

26. The method of claim 25, wherein step (d) further comprises:
   determining a displacement value using the position data, wherein the displacement value is related to the displacement of the offset measurement point from a reference point,
   correcting the displacement value to account for influence of the toe angle on the displacement value, and
   calculating the camber angle of the wheel using the corrected displacement value.

27. The method of claim 26, wherein the step of determining the displacement value comprises determining The displacement of the offset measurement point from the reference point along a horizontal axis that is perpendicular to the longitudinal axis of the vehicle.

28. The method of claim 26, wherein the correcting step further comprises determining a toe correction value in accordance with the toe angle and an offset value.

29. The method of claim 28, wherein the offset value is related to the displacement along the vehicle's longitudinal axis of the offset measurement point from a vertical reference plane that corresponds to a measured toe angle of zero degrees when the rotational plane of the wheel is perpendicular to the vertical reference plane.

30. The method of claim 29, wherein the offset value is the displacement along the longitudinal axis of the offset measurement point from a vertical plane extending through the center of the wheel perpendicular to the longitudinal axis.

31. The method of claim 25, wherein step (b) further comprises sensing the shaped light along an axis that passes through the vertical measurement plane.

32. The method of claim 25, wherein step (c) further comprises:
   (c1) projecting shaped light onto the sidewall of the wheel at fore and aft locations,
   (c2) sensing a portion of the shaped light reflected from the wheel at the fore and aft locations,
   (c3) generating fore and aft position data representative of the positions of respective fore and aft measurement points,
   (c4) determining the toe angle using the fore and aft position data.

33. The method of claim 32, further comprising the step of iteratively repeating steps (c3) and (c4), wherein the fore and aft measurement points comprise fore and aft crown points, respectively, and wherein step (c3) further comprises using the toe angle determined from a previous iteration to determine the position of the fore and aft crown points.

34. The method of claim 25, further comprising:
   (e) determining camber using steps (a) through (d) at each of two steered toe angles, and (f) determining a caster, angle of the wheel using the camber angles determined in step (e).

35. A method of determining the camber angle of a wheel of a vehicle using a measurement sensor that includes an optical sensor and one or more light sources for projecting shaped light onto the wheel, the method comprising the steps of:
   projecting shaped light onto a sidewall of the wheel at an upper location along an axis that is parallel to and offset from a vertical reference plane, wherein said vertical reference plane corresponds to a measured toe angle of zero degrees when the rotational plane of the tire is perpendicular to said vertical reference plane,
   sensing a portion of the shaped light reflected from the upper location and generating position data for an offset measurement point located at the upper location, and determining a camber angle for the wheel using the position data.

36. The method of claim 35, wherein said projecting step further comprises:
   projecting shaped light onto the sidewall along an axis that is offset from said vertical reference plane by a predetermined distance, and
   determining the camber angle using the position data and the predetermined distance.

37. The method of claim 36, further comprising the step of determining a toe angle for the wheel, wherein said step of determining the camber angle further comprises determining the camber angle using the position data, the predetermined distance and the toe angle.

38. The method of claim 35, further comprising the step of determining a toe angle for the wheel, wherein said step of determining the camber angle further comprises determining the camber angle using the position data and the toe angle.

39. A non-contact wheel alignment machine for use in determining one or more wheel alignment characteristics of a vehicle, comprising:
   a circuit having a microprocessor and memory accessible by said microprocessor, said memory having an executable computer program stored therein;
   one or more non-contact measurement sensors electrically connected to said circuit, wherein at least one of said measurement sensors includes:
      one or more light sources that projects shaped light onto a sidewall of the tire at fore, aft and upper locations, with said shaped light being projected onto the sidewall at said upper location along an axis that is parallel to and offset from a vertical reference plane, wherein said vertical reference plane corresponds to a measured toe angle of zero degrees when the rotational plane of the tire is perpendicular to said vertical reference plane; and
      an optical sensor system having one or more fields of view that includes said fore, aft, and upper locations, said optical sensor system being operable to provide data related to images contained within said fields of view;
   wherein said microprocessor is operable under control of said program to determine a camber angle associated with the tire using the data received from said optical sensor system.

40. A non-contact wheel alignment machine as defined in claim 39, wherein said microprocessor is operable under control of said program to determine a toe angle associated with the tire and to use said toe angle in determining a camber angle associated with the tire.

41. A non-contact wheel alignment machine as defined in claim 39, wherein said axis is offset from said vertical reference plane by a light source offset distance and wherein said microprocessor is operable under control of said program to utilize said light source offset distance in determining the camber angle of the tire.

42. A non-contact wheel alignment machine as defined in claim 41, wherein said microprocessor is operable under control of said program to determine a toe angle associated with the tire and to use said toe angle and said light source offset distance in determining a camber angle associated with the tire.

43. A non-contact wheel alignment machine as defined in claim 41, wherein said microprocessor is operable under control of said program to use said light source offset distance to determine a camber offset distance and to then use said camber offset distance in determining the camber angle of the tire.

44. A non-contact wheel alignment machine as defined in claim 43, wherein the camber offset distance is different than said light source offset distance and wherein said microprocessor is operable under control of said program to determine said camber offset distance using said light source offset distance and the perpendicular distance between the center of the tire and said vertical reference plane.

45. A non-contact wheel alignment machine as defined in claim 39, wherein said one or more light sources comprises three light sources, each of which projects light onto a different one of said fore, aft, and upper locations.

* * * * *